(12) United States Patent
Nagaoka et al.

(10) Patent No.: US 7,974,445 B2
(45) Date of Patent: Jul. 5, 2011

(54) VEHICLE PERIPHERY MONITORING DEVICE, VEHICLE, AND VEHICLE PERIPHERY MONITORING PROGRAM

(75) Inventors: Nobuharu Nagaoka, Wako (JP); Yuji Yokochi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/809,874

(22) PCT Filed: Oct. 7, 2008

(86) PCT No.: PCT/JP2008/002828
§ 371 (c)(1),
(2), (4) Date: Jun. 21, 2010

(87) PCT Pub. No.: WO2009/101660
PCT Pub. Date: Aug. 20, 2009

(65) Prior Publication Data
US 2010/0278392 A1 Nov. 4, 2010

(30) Foreign Application Priority Data

Feb. 13, 2008 (JP) ................................. 2008-032026

(51) Int. Cl.
*G06K 9/00* (2006.01)
(52) U.S. Cl. ............................ 382/106; 701/1; 340/903
(58) Field of Classification Search .................. 382/100, 382/103, 104, 106, 159, 181, 190, 195, 203, 382/206, 224–227; 701/1, 23–28, 45, 200; 340/436, 3.4, 3.41, 903
See application file for complete search history.

(56) References Cited

U.S. PATENT DOCUMENTS
5,144,685 A * 9/1992 Nasar et al. .................... 382/153
(Continued)

FOREIGN PATENT DOCUMENTS
JP 2002-312769 A 10/2002
(Continued)

OTHER PUBLICATIONS

Andreas Wedel et al., "Realtime Depth Estimation and Obstacle Detection From Monocular Video", Jan. 1, 2006, Pattern Recognition : 28TH DAGM Symposium, Berlin, Germany, Sep. 12-14, 2006; Proceedings; [Lecture Notes in Computer Science], Springer, Berlin, DE, pp. 475-484, XP019043086, ISBN: 978-3-540-44412-1 *Section 1 and 2, Equation 5*.

*Primary Examiner* — Anand Bhatnagar
(74) *Attorney, Agent, or Firm* — Carrier Blackman & Associates, P.C.; Joseph P. Carrier; William D. Blackman

(57) ABSTRACT

A vehicle periphery monitoring device which determines type of an object with high accuracy, wherein the size of object regions that are set in each of the image representing the peripheral condition of the vehicle in each of two different points in time and that include the identical objects, are aligned on the basis of the distance from the vehicle to the object in each of the two different point in time. Further, local regions with the same arrangement pattern are set taking each of the object regions with aligned size as reference. Still further, the object is classified into the object class which corresponds to the arrangement pattern in the case where the degree of correlation between the local regions becomes equal to or larger than a threshold value.

3 Claims, 6 Drawing Sheets

U.S. PATENT DOCUMENTS

| | | | |
|---|---|---|---|
| 5,937,079 A * | 8/1999 | Franke | 382/103 |
| 7,038,577 B2 * | 5/2006 | Pawlicki et al. | 340/435 |
| 7,330,568 B2 | 2/2008 | Nagaoka et al. | |
| 7,388,476 B2 | 6/2008 | Nagaoka et al. | |
| 7,526,104 B2 * | 4/2009 | Nagaoka et al. | 382/104 |
| 7,551,067 B2 * | 6/2009 | Otsuka et al. | 340/436 |
| 7,586,400 B2 | 9/2009 | Nagaoka et al. | |
| 7,724,962 B2 * | 5/2010 | Zhu et al. | 382/225 |
| 7,786,898 B2 * | 8/2010 | Stein et al. | 340/937 |
| 2002/0134151 A1 * | 9/2002 | Naruoka et al. | 73/291 |
| 2005/0276447 A1 | 12/2005 | Taniguchi et al. | |
| 2006/0115115 A1 | 6/2006 | Nagaoka et al. | |
| 2007/0171033 A1 | 7/2007 | Nagaoka et al. | |
| 2007/0291987 A1 * | 12/2007 | Saka et al. | 382/103 |

FOREIGN PATENT DOCUMENTS

| | | |
|---|---|---|
| JP | 2003-006642 A | 1/2003 |
| JP | 2004-303219 A | 10/2004 |
| JP | 2006-1151300 A | 6/2006 |
| JP | 2006-185432 | 7/2006 |
| JP | 2007-213561 A | 8/2007 |
| JP | 2007-334751 A | 12/2007 |
| JP | 2007-336091 A | 12/2007 |

* cited by examiner

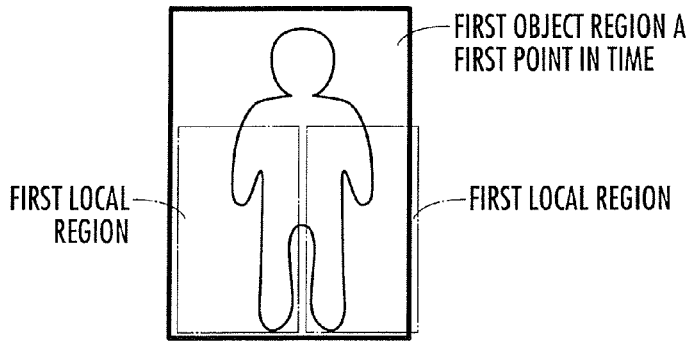
FIG.6 (a)
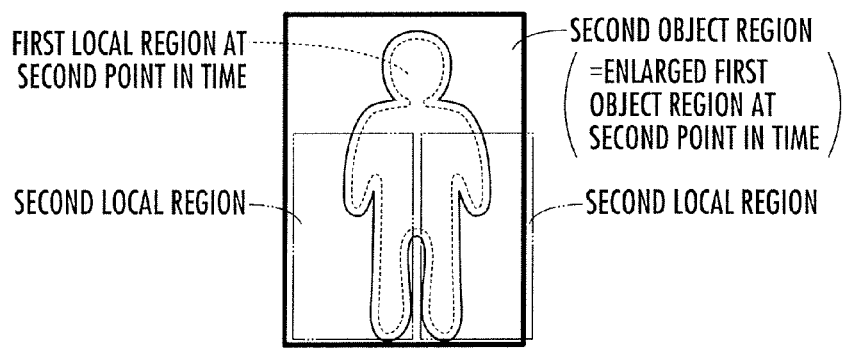
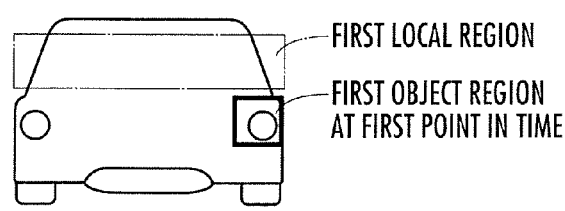
FIG.6 (b)
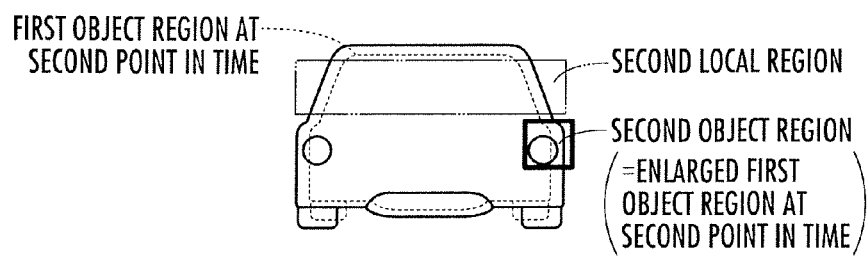

VEHICLE PERIPHERY MONITORING DEVICE, VEHICLE, AND VEHICLE PERIPHERY MONITORING PROGRAM

BACKGROUND OF THE INVENTION

1. Technical Field

The present invention relates to a device and the like which monitors a periphery of a vehicle, using an image obtained through an imaging device mounted on the vehicle.

2. Description of the Related Art

There is proposed a technique of measuring a real space position of an object such as a pedestrian, on the basis of an image obtained by a camera mounted on a vehicle, and determining a level of possibility of contact between the vehicle and the object on the basis of the measurement result (refer to Japanese Patent Laid-Open No. 2007-213561).

However, there are cases where it is preferable to determine a type of the object, from the viewpoint of avoiding contact between the vehicle and the object and the like.

SUMMARY OF THE INVENTION

In view of the above circumstances, an object to be solved by the present invention is to provide a device and the like capable of determining a type of the object with high accuracy.

According to a first aspect of the present invention, there is provided a vehicle periphery monitoring device which monitors a periphery of a vehicle using images representing a peripheral condition of the vehicle obtained through an imaging device mounted on the vehicle, comprising: an object detecting element which recognizes the existence of an object on the basis of the image; an object tracing element which determines whether or not the objects detected by the object detecting element on the basis of the images taken at each of a first point in time and a second point in time satisfy an identity requirement that the objects are identical; a distance measuring element which measures a distance from the vehicle to the object; a first object region setting element which sets a region in the image where the object exists as a first object region; a first local region setting element which sets a region arranged at a pattern in accordance with each of a plurality of object classes, taking the first object region at the first point in time as reference, as a first local region; a second object region setting element which sets, for the object determined as satisfying the identity requirement by the object tracing element, the first object region at the second point in time which is enlarged or reduced by a ratio of the distance at the second point in time to the distance at the first point in time that are measured by the distance measuring element, as a second object region; a second local region setting element which sets, in the same pattern as with the arrangement pattern of the first local region set by the first local region setting element, a region arranged taking the second object region set by the second object setting element as reference, as a second local region; a degree of correlation evaluating element which evaluates a degree of correlation between the first local region set by the first local region setting element and the second local region set by the second local region setting element; and an object classifying element which classifies the object to the object class in accordance with the arrangement pattern of the first local region satisfying a correlation requirement that the degree of correlation evaluated by the degree of correlation evaluating element is equal to or larger than a threshold value.

According to the vehicle periphery monitoring device of the first aspect of the invention, the size of the object regions (=the first object region) that are set in each of the images representing the peripheral condition of the vehicle in each of two different points in time (=the first point in time and the second point in time) and in which the identical objects exist, are aligned on the basis of the distance from the vehicle to the object in each of the two different points in time. Further, the local regions with the same arrangement pattern (=the first local region and the second local region) are set taking each of the object regions with aligned size (=the first object region at the first point in time, and the second object region (=the enlarged or reduced first object region at the second point in time) as reference. Still further, the object is classified into the object class which corresponds to the arrangement pattern in the case where the degree of correlation between the first local region and the second local region becomes equal to or larger than the threshold value. There is a high probability that the type of the object which corresponds to the arrangement pattern exists in each of the first local region and the second local region that are arranged in the pattern in which the degree of correlation, taking each of the first object region and the second object region in the first point in time as reference, becomes equal to or larger than the threshold value. Therefore, of a plurality of the arrangement patterns, by classifying the object into the object class which corresponds to the arrangement pattern having the degree of correlation equal to or larger than the threshold value, it becomes possible to determine the type of the object with high accuracy.

A vehicle of a second aspect of the invention is equipped with the vehicle periphery monitoring device according to the first aspect of the invention, which monitors the periphery of the vehicle using images representing the peripheral condition of the vehicle obtained through the imaging device.

According to the vehicle of the second aspect of the invention, it becomes possible to appropriately control the operation of the device mounted on the vehicle according to the determination result from the viewpoint of avoiding contact between the vehicle and the object or the like, because the type of the object is determined with high accuracy by the vehicle periphery monitoring device.

A vehicle periphery monitoring program of a third aspect of the invention, makes a computer mounted on a vehicle to function as the vehicle periphery monitoring device according to the first aspect of the invention, which monitors the periphery of the vehicle using images representing the peripheral condition of the vehicle obtained through the imaging device mounted on the vehicle.

According to the vehicle periphery monitoring program of the third aspect of the invention, it becomes possible to make the computer mounted on the vehicle function as the vehicle periphery monitoring device which determines the type of the object with high accuracy.

BRIEF DESCRIPTION OF THE DRAWINGS

FIG. 6 is an explanatory view with respect to a method of setting a first and a second local regions.

DETAILED DESCRIPTION OF THE PREFERRED EMBODIMENTS

An embodiment of a vehicle periphery monitoring device and the like according to the present invention will now be explained below with reference to the accompanying drawings.

Figure 1:
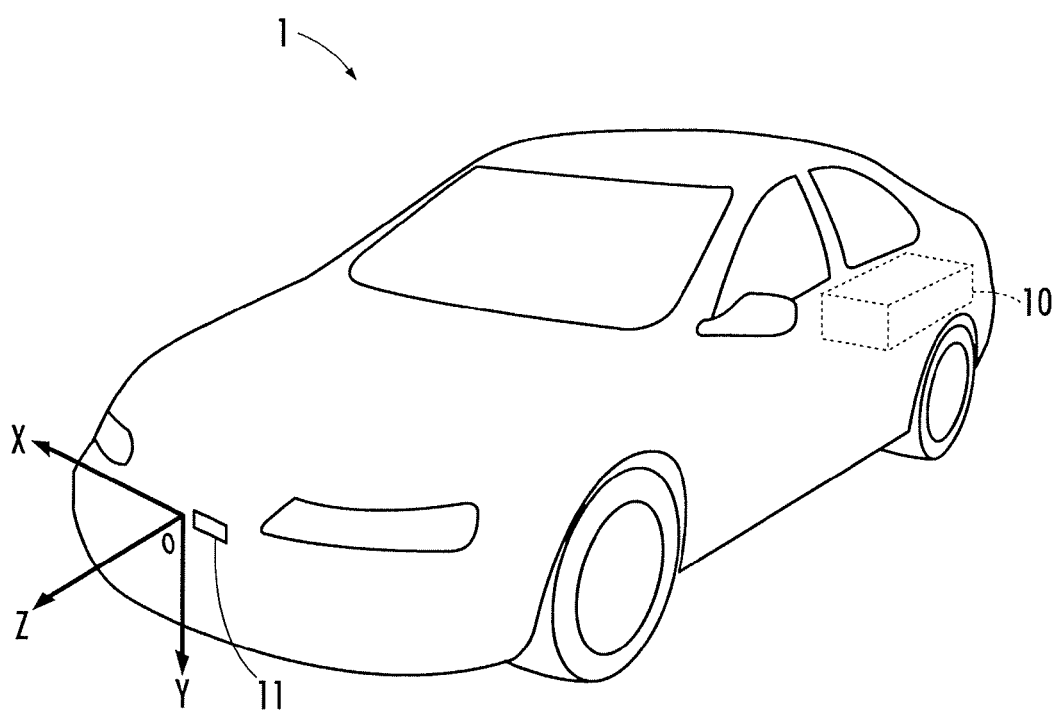
FIG. 1 is a view explaining the configuration of a vehicle of the present invention.
Figure 2:
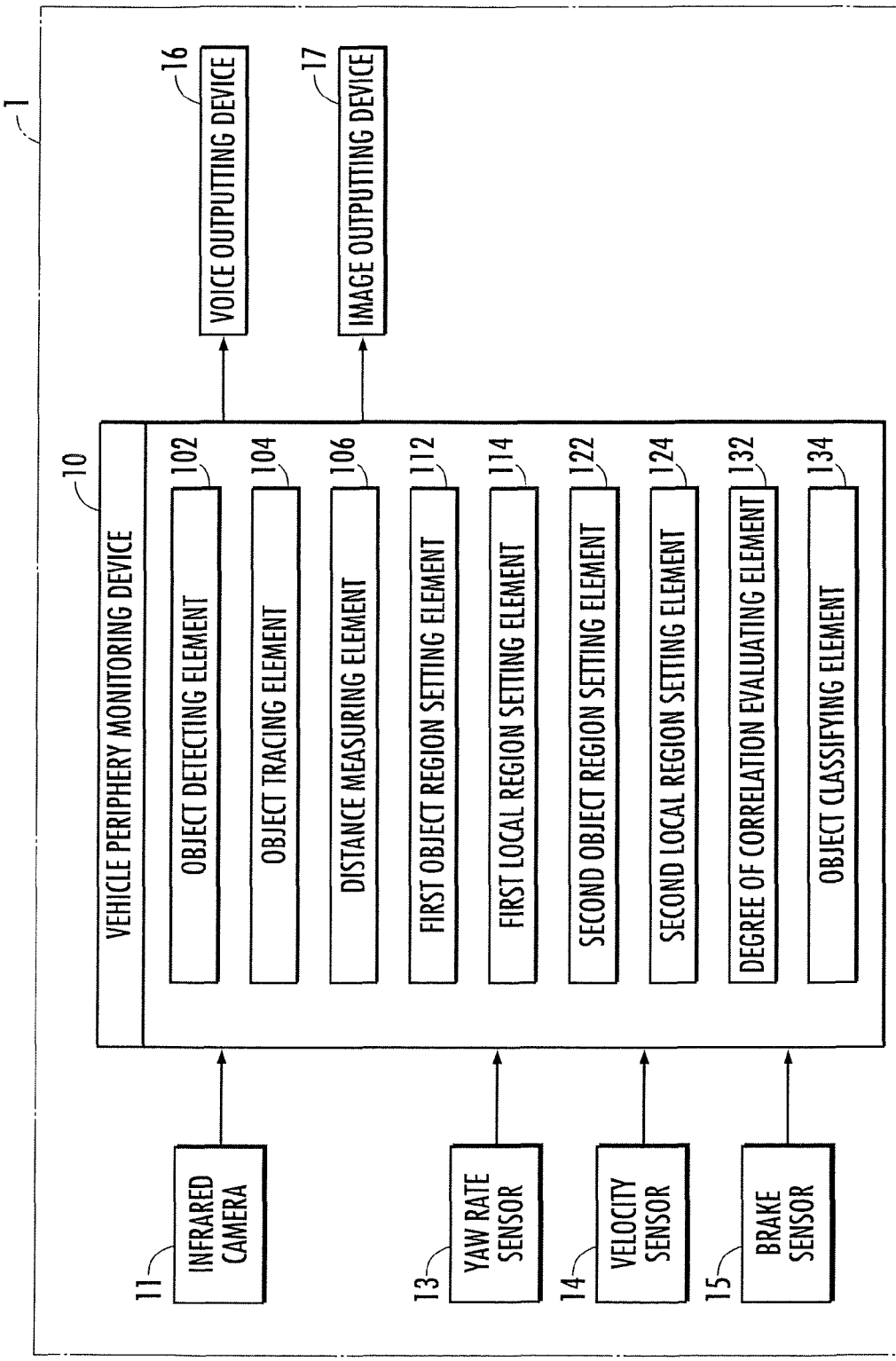
FIG. 2 is a view explaining the configuration of a vehicle periphery monitoring device of the present invention.

A vehicle (four-wheel automobile) 1 shown in FIG. 1 is mounted with a vehicle periphery monitoring device 10, and a single infrared camera (imaging device) 11. As is shown in FIG. 1, a real space coordinate system is defined such that an origin O is positioned at the front side of the vehicle 1, and an X-axis, a Y-axis, and a Z-axis thereof extends in the lateral direction, vertical direction, and anteroposterior direction of the vehicle 1, respectively. The infrared camera 11 is fixed to the front side of the vehicle 1, so as to capture images in front of the vehicle 1. Further, as is shown in FIG. 2, the vehicle 1 is mounted with various sensors, such as a yaw rate sensor 13, a velocity sensor 14, and a brake sensor 15 outputting signals based on yaw rate, velocity, and braking state of the vehicle 1, respectively. Further, as is shown in FIG. 2, the vehicle 1 is mounted with a voice outputting device 16 and a image outputting device 17. A HUD (head up display) which displays images to the windshield of the vehicle 1, or a display instrument indicating the running state of the vehicle 1, or a display device constituting a navigation device and the like may be adopted as the image outputting device 17.

The vehicle periphery monitoring device 10 is a device which monitors the periphery of the vehicle 1, using images obtained through the infrared camera 11. The vehicle periphery monitoring device 10 is configured from a computer (which is configured from a CPU, a ROM, a RAM, and electronic circuits such as an I/O circuit and A/D conversion circuit, and the like). The vehicle periphery monitoring device 10 is input with analog signals output from the infrared camera 11, the yaw rate sensor 13, a velocity sensor 14, and the brake sensor 15 or the like that are digitalized via the A/D conversion circuit. On the basis of the input data, and in accordance with a "vehicle periphery monitoring program" stored in the memory, the computer executes a processing of recognizing the existence of objects such as human being or other vehicle, a processing of determining the level of possibility of contact between the vehicle 1 and the recognized object, and a processing of making the voice outputting device 16 output voice or making the image outputting device 17 output images in accordance with the determination result. The program may be delivered or broadcasted at an arbitrary timing from the server via a network or satellite to a vehicular computer, and stored in a storage device such as RAM. The vehicle periphery monitoring device 10 may be configured from a single ECU, but may also be configured from a plurality of ECUs constituting a decentralized control system.

The vehicle periphery monitoring device 10 is equipped with, as is shown in FIG. 2, an object detecting element 102, an object tracing element 104, a distance measuring element 106, a first object region setting element 112, a first local region setting element 114, a second object region setting element 122, a second local region setting element 124, a degree of correlation evaluating element 132, and an object classifying element 134. The object detecting element 102 recognizes the existence of the object on the basis of the image representing the peripheral circumstances of the vehicle 1, which is obtained via the infrared camera 11. The object tracing element 104 determines whether of not the objects detected by the object detecting element 102 on the basis of the images taken at a first point in time and a second point in time, respectively, satisfy an "identical requirement" that they are identical. The image or the region at a given time means the image representing the peripheral circumstances of the vehicle 1 at the given time or a region set in the image. The distance measuring element 106 measures the distance from the vehicle 1 to the object. The first object region setting element 112 sets the region in the image where the object exists as a "first object region". A first local region setting element 114 sets the region arranged taking a first object region at the first point in time as reference as a "first local region". The arrangement pattern of the first local region taking the first object region as reference is defined for each of a plurality of object classes. The second object region setting element 122 sets a "second object region" for the object which is determined as satisfying the identity requirement by the object tracing element 104. A second object region is the first object region at the second point in time, which is enlarged or reduced by the ratio of the object distance at the second point in time to the object distance at the first point in time measured by the distance measuring element 106. The second local region setting element 124 sets the region arranged taking the second object region set by a second object region setting element 122 as reference, in a same pattern as with the arrangement pattern of the first local region set by the first local region setting element 114, as a "second local region". The degree of correlation evaluating element 132 evaluates the degree of correlation between the first local region set by the first local region setting element 114 and the second local region set by the second local region setting element 124. The object classifying element 134 classifies the object to the object class corresponding to the arrangement pattern of the first local region satisfying a "correlation requirement" that the degree of correlation evaluated by the degree of correlation evaluating element 132 is equal to or larger than a threshold value.

The explanation will be given on the function of the vehicle 1 and the vehicle periphery monitoring device 10 of the above-explained configuration.

Figure 3:
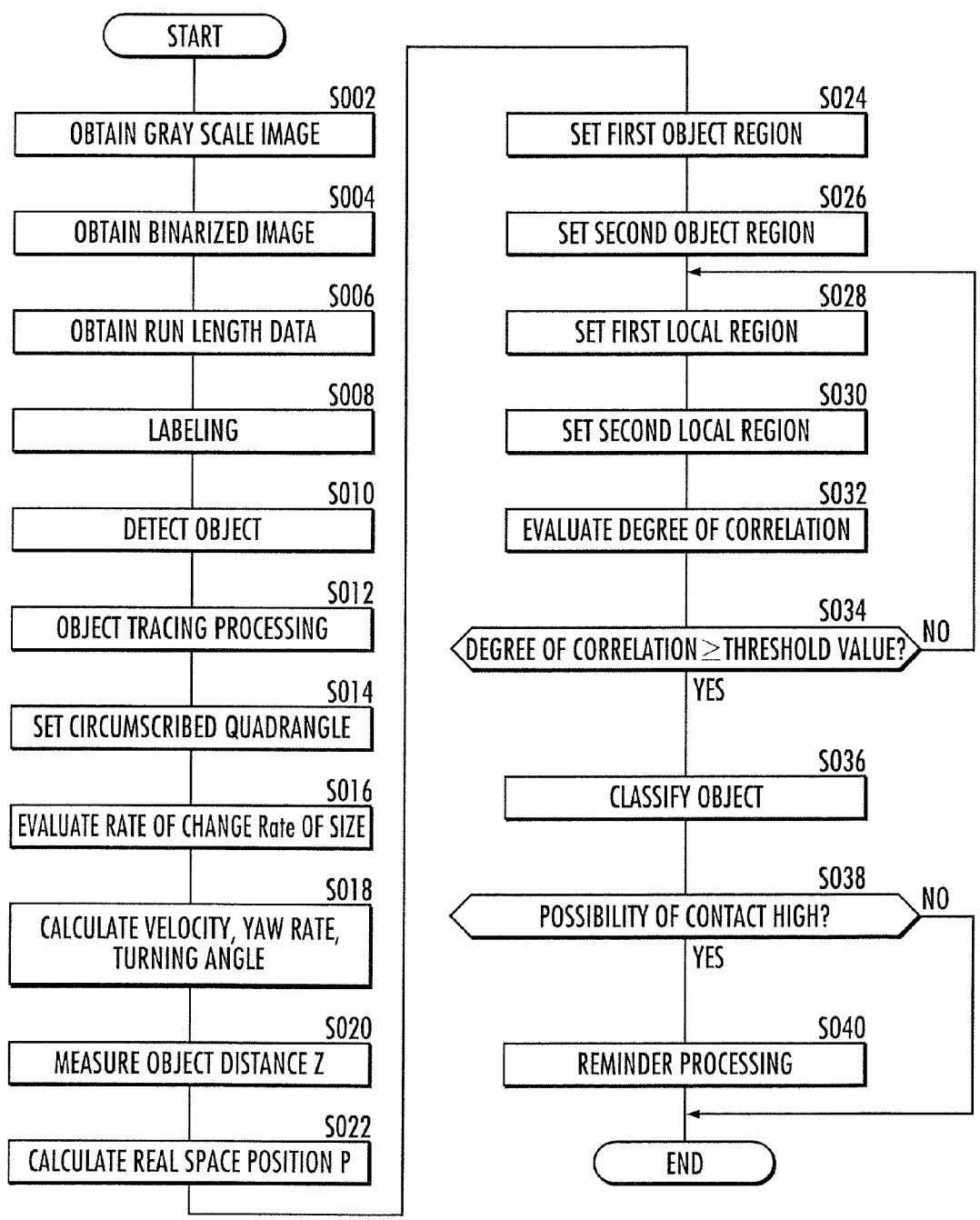
FIG. 3 is a flow chart showing the function of the vehicle periphery monitoring device of the present invention.
Figure 4:
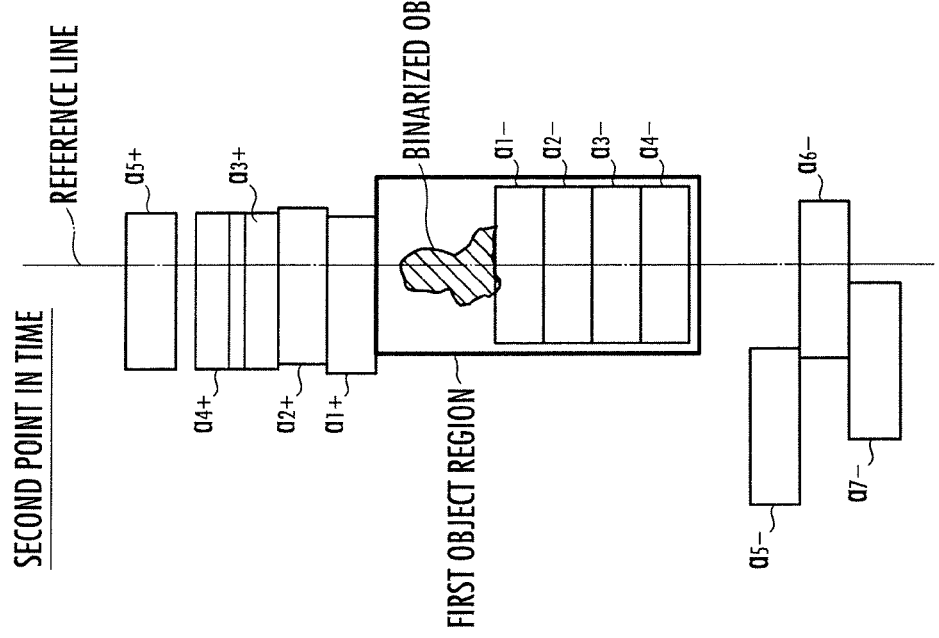
FIG. 4 is an explanatory view with respect to a method of setting a first object region.
Figure 4:
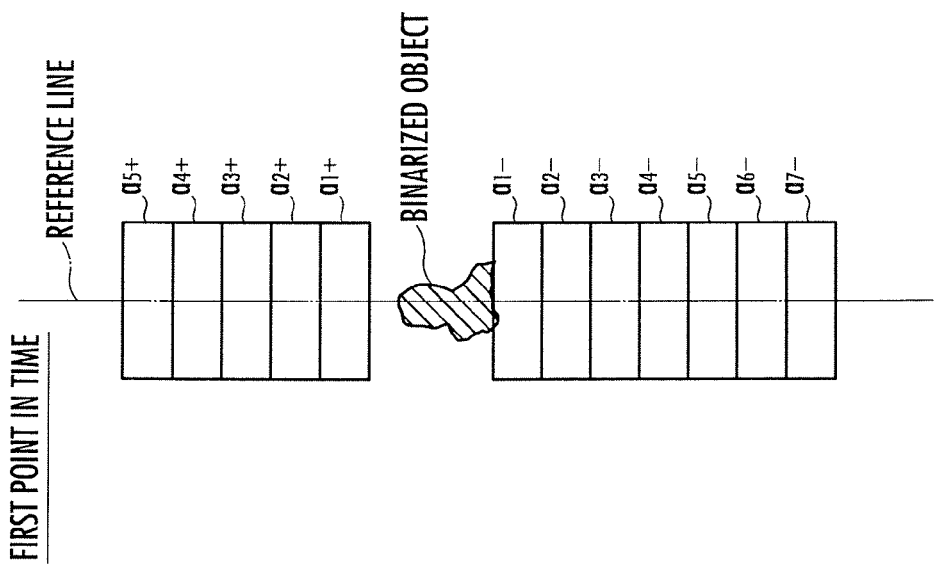

First, the object detecting element 102 detects the object on the basis of the image obtained through the infrared camera 11. Specifically, a gray scale image is acquired by A/D converting the infrared image which is the output signal from the infrared camera 11 (FIG. 3/S002). Further, a binarized image is acquired by binarizing processing the gray scale image (FIG. 3/S004). The binarizing processing is a process which classifies each pixel constituting the gray scale image to "1" (white) or "0" (black) in accordance with whether the brightness thereof is equal to or larger than a threshold value or not. The gray scale image and the binarized image are stored in different image memory from one another. Further, group of pixels that are sectionalized as "1" constituting a high brightness region of the binarized image and that are grouped together, is further classified to lines having width of one pixel in a longitudinal direction (y direction) of the image and extending in the lateral direction (x direction), wherein each line is converted as a run length data comprised of the coordinate of the position (two-dimensional position in the image) and the length (number of pixels) (FIG. 3/S006). Further, of the lines represented by the run length data, each line group overlapping in the longitudinal direction of the image is provided with a label (identifier), respectively, (FIG. 3/S008), and the line group is detected as the object (FIG. 3/S010). By doing so, the object (binarized object) as is indicated by slanting lines in the binarized image as is shown in FIG. 4(a) is detected. The object includes living substances such as human being (pedestrian), and artificial structural objects such as other vehicles. Further, there are cases where a plurality of local areas from a single object is recognized as the objects.

Thereafter, the object tracing element 104 carries out the tracing processing of the object, that is, the process of determining whether or not the objects detected in each arithmetic processing cycle of the object detecting element 102 are identical (FIG. 3/S012). For example, in accordance with the method disclosed in Japanese Patent Laid-Open No. 2001-6096, the process is carried out on the basis of the shape or size of the object detected in the binarized image at each time k−1 and k, the correlation of the brightness distribution in the gray scale images, and the like. In the case where these objects are determined as identical, the label of the object at time k is changed to the same label as the label of the object at time k−1.

Thereafter, the distance measuring element 106 measures the distance from the vehicle 1 to the object detected by the object detecting element 102 on the basis of the image. Specifically, a position of the center of gravity of the object in the binarized image is calculated, and a circumscribed quadrangle of the object is set (FIG. 3/S014). The position of the center of gravity of the object is obtained by adding, for all of the lines of the run length data corresponding to the object, the result of multiplying the coordinate of the central position of each line with the length of each line, and then dividing the result of addition by the area of the object in the image. In place of the center of gravity of the object, the position of a center of gravity (center) of the circumscribed quadrangle of the object may be calculated. Further, a rate of change Rate of a size of the object region representing the objects added with the identical label at different time is evaluated (FIG. 3/S016). Specifically, the ratio of the size (represented by length, width, or area of the circumscribed quadrangle) Size (k−1) of the object region at time k−1 to the Size (k) of the object region at time k is decided as the rate of change Rate (k)=Size (k−1)/Size (k) (<1). Further, the velocity and the yaw rate of the vehicle 1 is measured on the basis of the outputs from the yaw rate sensor 13 and the velocity sensor 14, respectively, and the turning angle (azimuth) of the vehicle 1 is calculated by integrating the measured value of the yaw rate (FIG. 3/S018).

Further in addition to the current time rate of change Rate (k), a distance Z(k) from the vehicle 1 to the object is measured according to an equation (1), on the basis of the current time velocity v(k) and an interval δT of the shooting time of the infrared camera 11 (FIG. 3/S020).

[Equation 1]

$$Z(k)=\text{Rate}(k)v(k)\delta T/(1-\text{Rate}(k)) \quad (1)$$

Thereafter, on the basis of the distance from the vehicle 1 to the object, the vehicle periphery monitoring device 10 calculates a real space position P(k)=(X(k), Y(k), Z(k)) of the object (FIG. 3/S022). Specifically, the X-coordinate X(k) and the Y-coordinate Y(k) in the real space coordinate system are calculated according to an equation (2), on the basis of a distance Z(k) from the vehicle 1 to each object, a focal length f of the infrared camera 11, and an image coordinate x(k) and y(k) of the region corresponding to the object in the acquired image. The center, rightward direction and downward direction of the acquired image are defined as an origin o, +x direction, and +y direction of the image coordinate system, respectively. Further, on the basis of the turning angle measured on the basis of the output of a yaw rate sensor 13, the real space position (X(k), Y(k), Z(k)) of each object is corrected by the turning angle.

[Equation 2]

$$X(k)=x(k)\cdot Z(k)/f,$$

$$Y(k)=y(k)\cdot Z(k)/f \quad (2)$$

Thereafter, on the basis of the arrangement pattern of the position of the center of gravity of the object and the circumscribed quadrangle in the binarized image, the first object region setting element 112 sets a region representing the object in the gray scale image as the "first object region" (FIG. 3/S024). Specifically, in the gray scale image representing the peripheral circumstances of the vehicle 1 at the first point in time, a plurality of masks that are arranged taking the object as reference are set. By doing so, for example as is indicated by slanting lines in FIG. 4(a), a plurality of rectangular masks $a_{i+}$ (i=1, 2, . . . ) and $a_{j-}$ (j=1, 2, . . . ) that are arranged side by side in the vertical direction of the object are set. A plurality of the masks are arranged so as to have its center position on a reference line (dot-and-dash line) passing the center of gravity or center of the object and extending in the vertical direction in the image. Further, the mask having the degree of correlation with a plurality of the masks equal to or larger than the threshold value is searched for from the gray scale image representing the peripheral circumstances of the vehicle 1 at the second point in time, which is before the first point in time. By doing so, the masks $a_{i+}$ and $a_{j-}$ having the degree of correlation with a plurality of the masks $a_{i+}$ and $a_{j-}$ at the first point in time equal to or larger than the threshold value are searched for from the image at the second point in time, as is shown in FIG. 4(b). Thereafter, a region including the object, and of a plurality of the masks, the masks having identical or almost identical positional relationship with the object at the first point in time and the second point in time and that are arranged continuously, is set as the first object region. By doing so, for example as is shown in FIG. 4(b), a rectangular region including the object and the masks $a_{1-}$ through $a_{4-}$ that are arranged continuously below the object, is set as the first object region.

Figure 5:
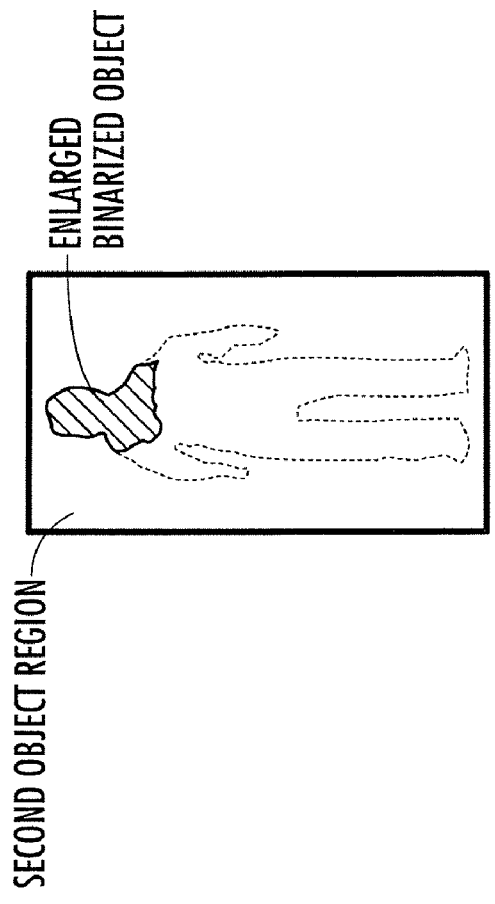
FIG. 5 is an explanatory view with respect to a method of setting a second object region.

Thereafter, the second object region setting element 122 sets a region obtained by enlarging the first object region at the second point in time is set as the "second object region" (FIG. 3/S026). By doing so, for example the first object region at the second point in time shown in FIG. 5(a) is enlarged, and the second object region shown in FIG. 5(b) is set. An enlargement factor of the first object region is measured by the distance measuring element 106, and is the same as the ratio of the distance from the vehicle 1 to the object at the second point in time to the distance from the vehicle 1 to the object at the first point in time. In the case where the second point in time is after the first point in time, then a region which is obtained by reducing the first object region at the second point in time may be set as the second object region. Further in the case where the ratio is smaller than 1, the region obtained by reducing the first object region at the second point in time is set as the second object region.

Thereafter, the first local region setting element 114 sets one or a plurality of the regions arranged taking the first object region at the first point in time as reference as the "first local region" (FIG. 3/S028). By doing so, for example as is shown in the upper half in each of FIG. 6(a) and FIG. 6(b), the region surrounded by the dot-and-dash line is set as the first local region. The arrangement pattern of the first local region taking the first object region as reference is defined corresponding to each of a plurality of the object classes. For example, the arrangement pattern of the first local region shown in FIG. 6(a) is defined by the object class of "human being". Further, the arrangement pattern of the first local region shown in FIG. 6(b) is defined by the object class of "automobile".

Thereafter, the second local region setting element 124 sets one or a plurality of the regions arranged taking the second object region as reference as the "second local region" (FIG. 3/S030). By doing so, for example as is shown in the lower half in each of FIG. 6(a) and FIG. 6(b), the region surrounded by two dot-and-dash line is set as the second local region. The second local region is arranged taking the second object region as reference, in the same pattern as with the arrangement pattern of the first local region taking the first object region as reference.

Thereafter, the degree of correlation evaluating element 132 evaluates the degree of correlation between the first local region and the second local region (FIG. 3/S032). Then, for each of the arrangement pattern of the first local region, it is determined whether or not a "correlation requirement" that the degree of correlation is equal to or larger than a threshold value (this value is different from the degree of correlation threshold value of the mask in setting the first object region), is satisfied (FIG. 3/S034). In the case where the determination result by the object classifying element 134 is affirmative (FIG. 3/S034 . . . YES), in the case where the determination result by the object classifying element 134 is negative (FIG. 3/S034 . . . NO), then the first local region and the second local region arranged in a pattern different from before are set, and the fulfillment of the correlation requirement is determined again (FIG. 3/S028, S030, S032). On the other hand, the object is classified into the object class corresponding to the arrangement pattern of the first local region (FIG. 3/S036). By doing so, for example in the case where the degree of correlation between the first local region and the second local region shown in FIG. 6(a) is equal to or larger than the threshold value, then the object is classified to the object class "human being" which corresponds to the arrangement pattern of the first local region. Further, in the case where the degree of correlation between the first local region and the second local region shown in FIG. 6(b) is equal to or larger than the threshold value (FIG. 3/S034 . . . YES), then the object is classified into the object class "automobile" which corresponds to the arrangement pattern of the first local region. In stead of or in addition to the classes such as human being and automobile, the object may be classified into classes including animals such as deer, plants such as trees, fixed objects such as buildings, and the like.

Further, on the basis of the real space position P(k) of each object at different time, the level of or existence or nonexistence of a possibility of contact between the vehicle 1 and each object is determined (FIG. 3/S038), according to, for example the determination method of possibility of contact disclosed in Japanese Patent Laid-Open No. 2001-6096. Then, in the case where it is determined that the possibility of contact between the vehicle 1 and the object is high (FIG. 3/S038 . . . YES), a reminder processing is carried out in a pattern according to the type of the object determined by the object classifying element 134 (FIG. 3/S040). Specifically, the voice and the image (a frame for highlighting the object and the like) according to the determination result of the possibility of contact and the classification result of the object are output through the voice outputting device 16 and the image outputting device 17, respectively. For example, in the case where the object is classified as a human being, the output pattern of the voice and the image is adjusted so as to make the driver of the vehicle 1 recognize the existence of the object strongly than in the case where the object is classified as a vehicle. Only one of the voice and the image may be output. Further, the reminder processing may be carried out on condition that it is confirmed on the basis of the output from the brake sensor 15 that the driver is not operating the brake of the vehicle 1, or it is confirmed on the basis of the output from the velocity sensor 14 or an acceleration sensor (not shown) that the deceleration of the vehicle 1 is equal to or lower than a threshold value. On the other hand, in the case where it is determined that the possibility of contact between the vehicle 1 and the object is low (FIG. 3/S038 . . . NO), then the reminder processing is not carried out.

Further, in the case where a running behavior of the vehicle 1 is operated by operating a part or all of a steering device, a braking device, and an accelerating device of the vehicle 1 by actuators, a vehicle behavior may be controlled in place of or in parallel to the reminder processing. Specifically, a part or all of the movement of the steering device, the braking device, and the accelerating device of the vehicle 1 may be controlled by a vehicle control unit (not shown), so as to avoid contact with the object determined as having high possibility of contact with the vehicle 1, or to facilitate avoiding therewith. For example, the accelerating device is controlled to make the vehicle 1 difficult to accelerate, by increasing the necessary treading force of the accelerating pedal by the driver than in the normal condition where there is no necessity of avoiding contact with the object. Further, operation of a steering handle in a driving direction required for avoiding contact between the vehicle 1 and the object is made easier to carry out, by decreasing the required rotating force of the steering handle of the driving device in the steering direction than the required rotating force of the steering handle in the opposite direction. Still further, an increasing speed of a braking force of the vehicle 1 according to the stepped amount of a brake pedal of the braking device is increased than in the normal case. By doing so, it becomes possible to make the driving of the vehicle 1 for avoiding contact with the object easier.

According to the vehicle periphery monitoring device 10 exerting the above-mentioned function, the size of the object regions (=the first object region) that are set in each of the images representing the peripheral condition of the vehicle 1 in each of two different points in time (=the first point in time and the second point in time) and in which the identical objects exist, are aligned on the basis of the distance from the vehicle to the object in each of the two different points in time (refer to FIG. 3/S020, S024, S026, FIG. 5(a) and (b)). Further, the local regions with the same arrangement pattern (=the first local region and the second local region) are set taking each of the object regions with aligned size (=the first object region at the first point in time, and the second object region (=the enlarged or reduced first object region at the second point in time) as reference (refer to FIG. 3/S028, S030, FIG. 6(a) and (b)). Still further, the object is classified into the object class which corresponds to the arrangement pattern in the case where the degree of correlation between the first local region and the second local region becomes equal to or larger than the threshold value (refer to FIG. 3/S034, S036). There is a high probability that the type of the object which corresponds to the arrangement pattern exists in each of the first local region and the second local region that are arranged in the mode in which the degree of correlation, taking each of the first object region and the second object region in the first point in time as a reference, becomes equal to or larger than the threshold value. Therefore, of a plurality of the arrangement patterns, by classifying the object into the object class which corresponds to the arrangement pattern having the degree of correlation equal to or larger than the threshold value, it becomes possible to determine the type of the object with high accuracy. Thereafter, the operation of the device mounted on the vehicle 1 (the voice outputting device 16, the image outputting device 17, the steering device, the braking device, and the accelerating device) may be appropriately controlled from the viewpoint of avoiding contact between the vehicle 1 and the object and the like, according to the classification result of the object.

In the present embodiment, the distance from the vehicle 1 and the object is measured using one infrared camera (a monocular camera). However, as another embodiment, the distance from the vehicle 1 to the object may be measured using a milliwave radar, a laser radar, or an ultrasonic radar and the like. Further, as a still another embodiment, the distance may be calculated using a parallax of a pair of infrared cameras arranged laterally symmetrically taking the front center portion of the vehicle as a reference. Further, in place of the infrared camera 11, a camera with the photographic sensitivity adjusted to another wavelength region such as to optical wavelength, may be used as the imaging device.

The invention claimed is:

1. A vehicle periphery monitoring device which monitors a periphery of a vehicle using images representing a peripheral condition of the vehicle obtained through an imaging device mounted on the vehicle, comprising:
    an object detecting element which recognizes the existence of an object on the basis of the image;
    an object tracing element which determines whether or not the objects detected by the object detecting element on the basis of the images taken at each of a first point in time and a second point in time satisfy an identity requirement that the objects are identical;
    a distance measuring element which measures a distance from the vehicle to the object;
    a first object region setting element which sets a region in the image where the object exists as a first object region;
    a first local region setting element which sets a region arranged at a pattern in accordance with each of a plurality of object classes, taking the first object region at the first point in time as reference, as a first local region;
    a second object region setting element which sets, for the object determined as satisfying the identity requirement by the object tracing element, the first object region at the second point in time which is enlarged or reduced by a ratio of the distance at the second point in time to the distance at the first point in time that are measured by the distance measuring element, as a second object region;
    a second local region setting element which sets, in the same pattern as with the arrangement pattern of the first local region set by the first local region setting element, a region arranged taking the second object region set by the second object setting element as reference, as a second local region;
    a degree of correlation evaluating element which evaluates a degree of correlation between the first local region set by the first local region setting element and the second local region set by the second local region setting element; and
    an object classifying element which classifies the object to the object class in accordance with the arrangement pattern of the first local region satisfying a correlation requirement that the degree of correlation evaluated by the degree of correlation evaluating element is equal to or larger than a threshold value.

2. A vehicle equipped with the vehicle periphery monitoring device according to claim 1, which monitors the periphery of the vehicle using images representing the peripheral condition of the vehicle obtained through the imaging device.

3. A vehicle periphery monitoring system, comprising a computer mounted on a vehicle and a non-transitory computer readable medium having program instructions stored thereon for causing the computer to function as the vehicle periphery monitoring device according to claim 1, which monitors the periphery of the vehicle using images representing the peripheral condition of the vehicle obtained through the imaging device mounted on the vehicle.

* * * * *